United States Patent
Mikame (10) Patent No.: US 7,788,031 B2
(45) Date of Patent: Aug. 31, 2010

(54) ROUTING ASSISTANCE SYSTEM (75) Inventor: Masami Mikame, Anjo (JP)

(73) Assignee: DENSO CORPORATION, Kariya (JP)

( * ) Notice: Subject to any disclaimer, the term of this patent is extended or adjusted under 35 U.S.C. 154(b) by 1037 days.

(21) Appl. No.: 11/511,252

(22) Filed: Aug. 29, 2006

(65) Prior Publication Data
US 2007/0055444 A1    Mar. 8, 2007

(30) Foreign Application Priority Data
Sep. 5, 2005 (JP) .............................. 2005-256851

(51) Int. Cl.
*G01C 21/30* (2006.01)
(52) U.S. Cl. .................. 701/211; 701/26; 701/200; 701/207; 701/209; 701/210; 340/988; 340/990; 340/995.1; 340/995.2; 340/995.21
(58) Field of Classification Search .................. None
See application file for complete search history.

(56) References Cited

U.S. PATENT DOCUMENTS

| | | | | |
|---|---|---|---|---|
| 5,629,854 A | * | 5/1997 | Schulte | 701/207 |
| 5,848,364 A | * | 12/1998 | Ohashi | 701/26 |
| 6,108,604 A | * | 8/2000 | Fukaya et al. | 701/211 |
| 6,151,552 A | * | 11/2000 | Koizumi et al. | 701/211 |
| 6,345,230 B1 | * | 2/2002 | Hiyokawa et al. | 701/209 |
| 6,347,280 B1 | * | 2/2002 | Inoue et al. | 701/211 |
| 6,529,822 B1 | * | 3/2003 | Millington et al. | 701/206 |
| 6,934,627 B2 | * | 8/2005 | Kawakami et al. | 701/210 |
| 7,054,745 B1 | * | 5/2006 | Couckuyt et al. | 701/211 |
| 2001/0041962 A1 | * | 11/2001 | Sugawara et al. | 701/211 |
| 2002/0072849 A1 | * | 6/2002 | Endo et al. | 701/211 |
| 2003/0236616 A1 | * | 12/2003 | Kawakami et al. | 701/209 |
| 2004/0210383 A1 | * | 10/2004 | Sato | 701/207 |
| 2008/0208466 A1 | * | 8/2008 | Iwatani | 701/211 |

FOREIGN PATENT DOCUMENTS

JP    A-2002-202146    7/2002

* cited by examiner

*Primary Examiner*—Khoi Tran
*Assistant Examiner*—Jonathan Sample
(74) *Attorney, Agent, or Firm*—Posz Law Group, PLC

(57) ABSTRACT

When a rotary intersection is of large scale, "rotary intersection guidance based on exit number" is provided. That is, it is informed from what number exit road of the multiple exit roads of a rotary intersection, relative to an entrance road, the driver should get off. For example, the guidance of "Get off from the second exit road ahead" is provided. In contrast, when a rotary intersection is of small scale and the rotary intersection is in simple shape, "rotary intersection guidance based on direction guidance" is provided. That is, the direction of an exit road about which guidance is to be provided, relative to an entrance road, is informed. For example, the guidance of "Turn to the right" is provided.

10 Claims, 4 Drawing Sheets

[CROSS]

FIG. 4B

[T-SHAPED]

FIG. 4C

[T-SHAPED]

FIG. 4D

[STRAIGHT]

ROUTING ASSISTANCE SYSTEM

CROSS REFERENCE TO RELATED APPLICATIONS

This application is based on and incorporates herein by reference Japanese Patent Application No. 2005-256851 filed on Sep. 5, 2005.

FIELD OF THE INVENTION

The present invention relates to a routing assistance system and the like that provide guidance with respect to exits of rotary intersections.

BACKGROUND OF THE INVENTION

Rotary intersections are more complicated in structure as compared with ordinary crossroads. With respect to rotary intersections, therefore, automobile navigation systems are required to provide drivers with routing assistance easier to understand. Rotary intersections are often found in North America, Europe, and Australia. In general, they are designated as traffic circle in North America, as roundabout in Europe and Australia, and as rotary in Japan.

With respect to guidance for such a rotary intersection, there is a method in which it is informed that from what number exit the driver should get off after he/she enters a rotary intersection, for example, "Get off from the second exit ahead." (Refer to Patent Document 1.) Such guidance will be designated as "rotary intersection guidance based on exit number."

There is also a method in which guidance is provided based on the angle formed by a road that goes into a rotary intersection (entrance road) and a road that exits from the rotary intersection (exit road). Thus, the direction of the exit road about which guidance is to be provided, relative to the entrance road, is informed, for example, "Turn to the right," or "Turn to the left." (Refer to Patent Document 2.) Such guidance will be designated as "rotary intersection guidance based on direction guidance."

Patent Document 1: JP-H11-72343 A (US006151552 A)

Patent Document 2: JP-H11-51684 A (US006108604 A)

There is a wide variety of the above-mentioned rotary intersections in size and number of exit roads (exits). Some rotary intersections are relatively small in size and less than 10 m in the radius of their circular portion. Other rotary intersections are relatively large in size and equal to or greater than 20 m in radius. Some have two or three exit roads and others have five or six.

As mentioned above, rotary intersections have various scales. With respect to all the rotary intersections, either of the "rotary intersection guidance based on exit number" and the "rotary intersection guidance based on direction guidance" is not superior to the other.

Some examples will be taken. For large-scale rotary intersections, the "rotary intersection guidance based on direction guidance" is unfavorable in the following respect: after entering a large-scale rotary intersection, a driver drives his/her vehicle along a route that continuously bends at a certain curvature, for example. Therefore, the driver gradually gets disoriented or loses his/her sense of direction relative to the entrance road. As a result, the driver can get a wrong idea about the direction informed as an exit road and wrongly perceive the exit road about which guidance is provided. The reason for this is as follows: in cases where, after entering a rotary intersection, a driver must go round a curve by 270° and exits it, for example, he/she gets confused about by how many degrees he/she has been going round the curve.

Meanwhile, the "rotary intersection guidance based on exit number" does not pose this problem. In cases where a driver follows the guidance of "Get off from the second exit road ahead," he/she need not be conscious of by how many degrees he/she has been going round a curve after entering a rotary intersection, as mentioned above. The driver only has to be conscious of the number of exit roads.

For small-scale rotary intersections, the "rotary intersection guidance based on direction guidance" is preferable. The reason for this is as follows: in this case, the user can easily grasp the positional relation between an entrance road and an exit road; therefore, he/she can intuitively understand better the guidance of "Turn to the right," for example. In case of small-scale rotary intersection, the driver does not lose his/her sense of direction, that is, the situation in which a driver gets confused about "by how many degrees he/she has been going round a curve" does not occur.

Meanwhile, the "rotary intersection guidance based on exit number," slightly disagrees with the user's sense. When the driver is provided with such guidance as "Turn to the right," as mentioned above, he/she can intuitively understand it. When he/she is provided with such guidance as "Get off from the third exit road ahead" on purpose, he/she contrarily gets confused.

SUMMARY OF THE INVENTION

The invention has been made with the above problems taken into account. It is an object of the invention to provide a routing assistance system, in which guidance is appropriately provided according to characteristics of rotary intersections.

According to an aspect of the present invention, a routing assistance system in a vehicle is provided with the following. A guidance unit provides the vehicle with guidance along a guided route including a rotary intersection, which the vehicle enters via an entrance road. A guidance control unit causes the guidance unit to provide guidance with respect to an exit road of the rotary intersection. A determination unit executes a determination of whether the rotary intersection has a predetermined simple shape and a scale smaller than or equal to a predetermined scale. When the determination is affirmed, the guidance control unit causes the guidance unit to provide a first guidance with respect to a direction of an exit road about which guidance is to be provided, relative to the entrance road. When the determination is negated, the guidance control unit causes the guidance unit to provide a second guidance with respect to from what number exit road of a plurality of exit roads of the rotary intersection, relative to the entrance road, the vehicle is to exit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Description of Configuration of Automobile Navigation System 1

Figure 1:
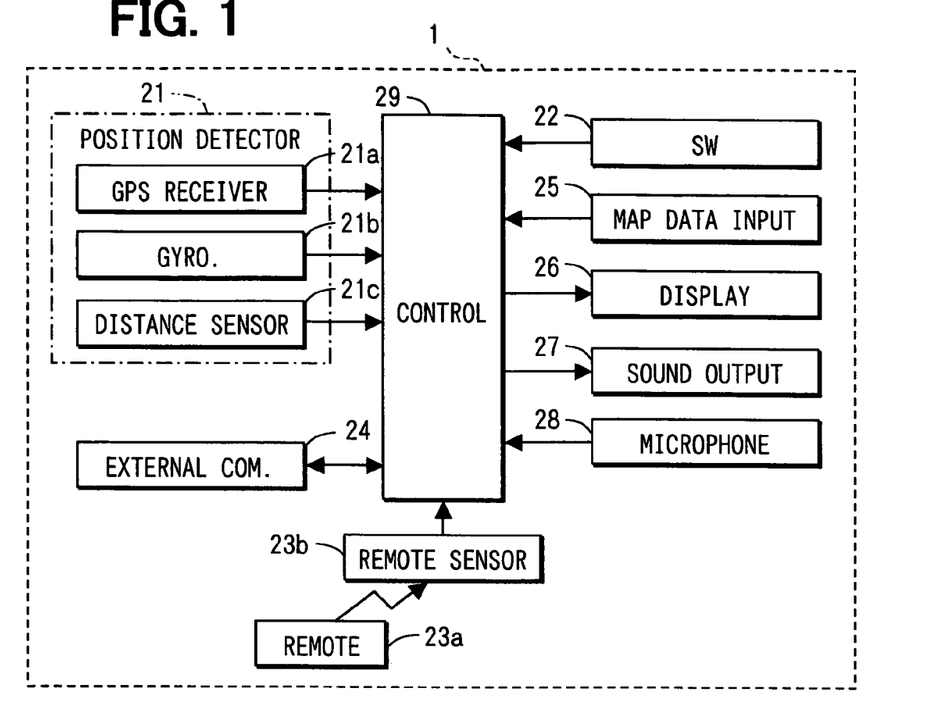
FIG. 1 is a schematic block diagram of an automobile navigation system.

FIG. 1 is a block diagram illustrating the general configuration of an automobile navigation system 1 in which the functions of a routing assistance system of the invention are incorporated.

The automobile navigation system 1 is mounted in a vehicle and includes: a position detector 21 that detects the current position of the vehicle; an operation switch group 22 for inputting various instructions from the user; a remote control terminal (hereafter, referred to as remote) 23a that is capable of inputting various instructions like the operation switch group 22 and is separate from the automobile navigation system 1; a remote sensor 23b for inputting signals from the remote 23a; an external communication instrument 24 that is connected to a packet telecommunication network or the like and communicates with external sources; a map data input device 25 that inputs data from map storage media with map data, speech data, and the like recorded thereon; a display unit 26 for displaying map and varied information; a sound output unit 27 for outputting varied audio guidance and the like; a microphone 28 that outputs electrical signals based on a speech given out by the user; and a control unit 29 that carries out varied processing according to inputs from the above-mentioned position detector 21, operation switch group 22, remote sensor 23b, external communication instrument 24, map data input device 25, or microphone 28, and controls the external communication instrument 24, display unit 26, and sound output unit 27.

The position detector 21 includes: a GPS receiver 21a that receives radio waves from artificial satellites for GPS (Global Positioning System) through a GPS antenna, not shown, and outputs reception signals; a gyroscope 21b that detects the magnitude of rotational motion applied to the vehicle; a distance sensor 21c for detecting the distance traveled by the vehicle from the acceleration of the vehicle in the longitudinal direction and the like. The control unit 29 computes the position, orientation, speed, and the like of the vehicle based on output signals from the sensor and the like 21a to 21c. There are various methods for determining the current position based on output signals from the GPS receiver 21a. The point positioning method or the relative positioning method may be adopted.

The operation switch group 22 is constructed of: a touch panel constructed integrally with the display surface of the display unit 26; mechanical key switches provided around the display unit 26; and the like. The touch panel and the display unit 26 are laminated and integrated with each other. There are various types of touch panel, pressure sensing type, electromagnetic induction type, and combinations of them. Any of them may be used.

The external communication instrument 24 acquires accident information, traffic jam information, and the like from a VICS (Vehicle Information and Communication System) information center through light beacons, radio beacons, and the like installed on the roadside.

The map data input device 25 is a device for inputting varied data stored on map data storage media (e.g. hard disk and DVD-ROM), not shown. On map data storage media, there are stored map data (node data, link data, cost data, background data, road data, name data, mark data, crossroads data, facility data, etc.), speech data for guidance, speech recognition data, and the like. With respect to roads consisting of multiple carriage ways in the same traveling direction, separated by an impassible separating band, link data and speech data for guidance are allocated on a carriage way-by-carriage way basis.

The display unit 26 is a color display device, and there are various types of color display devices, liquid crystal display, organic EL display, CRT, and the like. Any of them may be used. The following can be displayed in superposition in the display screen of the display unit 26: a mark that indicates the present location identified from the current position detected by the position detector 21 and map data inputted from the map data input device 25; a directed route (or guided route) to a destination, additional data such as names, landmarks, and marks for various facilities. The display unit is also capable of displaying facility guide and the like.

The sound output unit 27 can output guides to facilities inputted from the map data input device 25 and varied audio guidance. When the user inputs (gives out) his/her speech, the microphone 28 outputs an electrical signal (audio signal) based on the inputted speech to the control unit 29. The user can operate the automobile navigation system 1 by inputting varied speech to the microphone 28.

The control unit 29 is constructed based on a publicly known microcomputer composed of CPU, ROM, RAM, SRAM, I/O, bus lines that connect these items, and the like, and carries out varied processing based on programs stored in the ROM and the RAM. For example, it carries out the following processing: processing in which the current position of the vehicle is computed as a set of coordinates and a traveling direction based on various detection signals from the position detector 21, and the display unit 26 is caused to display a map of the area in proximity to the current position, read through the map data input device 25, and the like; route computation processing in which the optimum route from the current position to a destination is computed based on map data stored in the map data input device 25 and the destination set according to the operation of the operation switch group 22, the remote 23a, or the like; routing assistance processing in which the display unit 26 is caused to display the computed route or the sound output unit 27 is caused to output it by speech; and other like processing.

The control unit 29 is so constructed that it can also carry out speech recognition processing. A processing unit related to speech recognition and a processing unit related to navigation may be so constructed that they are separated from each other, needless to add. In this example, however, a construction capable of carrying out speech recognition processing is built in the control unit 29.

Description of Guidance about Exit Roads of Rotary Intersection

Description will be given to processing of guidance about the exit roads of a rotary intersection with respect to the flowchart in FIG. 2. This is processing characteristic of the automobile navigation system 1 in this embodiment among the varied processing carried out by the control unit 29.

This processing of guidance about the exit roads of a rotary intersection is processing the execution of which is started in the control unit 29 when the vehicle arrives at a point at a predetermined distance from the rotary intersection while the above-mentioned routing assistance processing is being carried out. (This predetermined distance is, for example, a distance from which it requires 10 seconds or longer to arrive at, at least, an approach path to the rotary intersection, such as 500 m to the rotary intersection.) The above-mentioned route computation processing and routing assistance processing, carried out by the automobile navigation system 1, are conventionally known processing; therefore, the description of them will be omitted.

General Description of Processing of Guidance about Exit Roads of Rotary Intersection After the control unit 29 starts the execution of the guidance processing for rotary intersection exit roads, it acquires data about the shape of a rotary intersection about which guidance is to be provided (S10). The control unit 29 reads map data stored in map data storage media, not shown, through the map data input device 25, and acquires this rotary intersection shape data from data contained in the map data.

Then, the control unit 29 determines whether or not the rotary intersection about which guidance is to be provided is of small scale (S20). The technique for determining the scale of a rotary intersection will be described later.

In cases where the rotary intersection is not of small scale but of large scale (S20: NO), the control unit 29 proceeds to S30, and provides "rotary intersection guidance based on exit number." This "rotary intersection guidance based on exit number" is guidance in which the following is informed: from what number exit road relative to the entrance road, among the multiple exit roads of the rotary intersection, the driver should get off. An example of this guidance is "Get off from the second exit road ahead."

In cases where the rotary intersection is of small scale (S20: YES), the control unit 29 determines whether or not the shape of the rotary intersection about which guidance is to be provided is simple (S40). The technique for determining whether or not the shape is simple will be described later.

In cases where the shape of the rotary intersection is not simple (S40: NO), the control unit 29 proceeds to S30, and provides the above-mentioned "rotary intersection guidance based on exit number." In cases where the shape of the rotary intersection is simple (S40: YES), the control unit 29 proceeds to S50, and provides "rotary intersection guidance based on direction guidance." This "rotary intersection guidance based on direction guidance" is guidance in which the following is informed: the direction of the exit road about which guidance is to be provided, relative to the entrance road to the rotary intersection. An example of this guidance is "Turn to the right."

In this embodiment, specifically, the following processing is carried out: the "rotary intersection guidance based on direction guidance" is provided (S50) only when the following determination conditions are met: a rotary intersection should be of small scale (S20: YES), and at the same time, its shape should be simple (S40: YES). In cases where either determination condition is not met, that is, when a rotary intersection is of large scale (S20: NO) or when a rotary intersection is of small scale but its shape is not simple (S40: NO), the "rotary intersection guidance based on exit number" is provided (S30).

The foregoing is the general description of the processing of guidance of the exit roads of a rotary intersection. Subsequently, detailed description will be given to the determinations at S20 and S40 in sequence.

Technique for Determining Scale of Rotary Intersection at S20

At S20, the control unit 29 determines whether or not a rotary intersection about which guidance is to be provided is of small scale. Specifically, it determines a rotary intersection to be of small scale when the total value of the link lengths of the rotary intersection or the radius of the rotary intersection is equal to or smaller than a predetermined value.

Figure 3A:
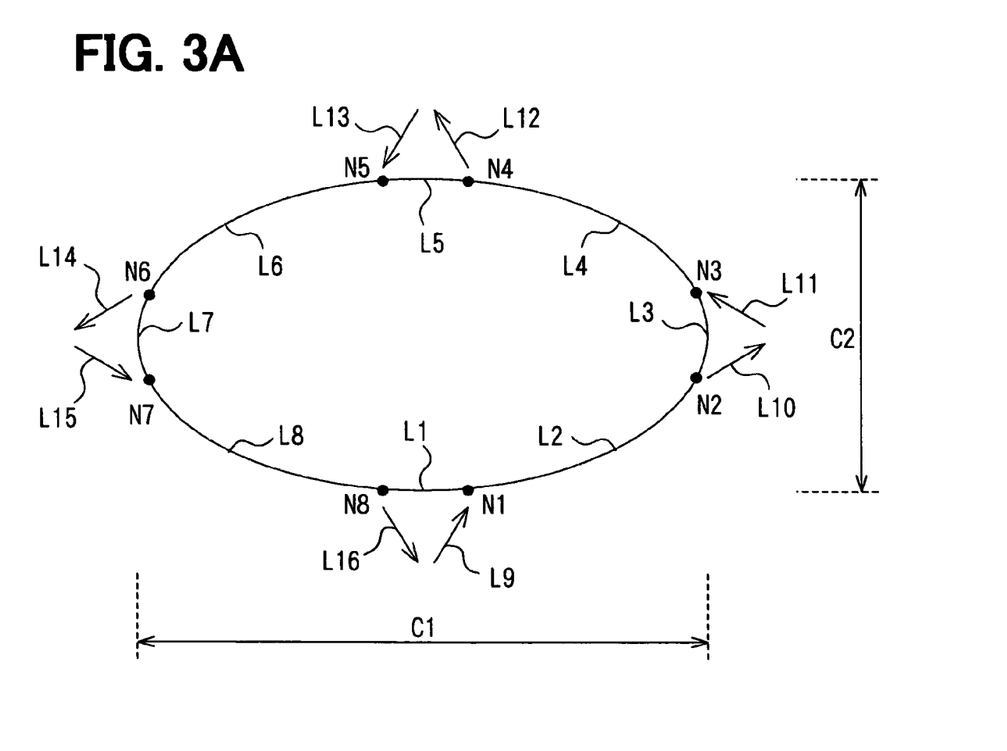
FIG. 3A is an explanatory diagram of construction of links and nodes of a rotary intersection.

In order to make the "total value of the link lengths of a rotary intersection or the radius of the rotary intersection" easier to understand, description will be given on the assumption that the rotary intersection is as illustrated in FIG. 3A.

Description will be given to data set with respect to a rotary intersection. In this rotary intersection, a circular route is constructed of links L1 to L8, and further links L9 to L16 that form the entrance/exit roads to/from the rotary intersection are set for nodes N1 to N8 that form the respective terminating nodes of the links L1 to L8. With respect to the circular route consisting of the links L1 to LB, the direction of traffic is predetermined, and it is of one-way traffic. When L1 is taken as traffic origin, for example, the order of the links is as follows: L1→L2→L3→L4→L5→L6→L7→L8.

Here, detailed description will be given to which node the links L9 to L16 that make the entrance/exit roads to/from the rotary intersection are respectively connected.

The entrance link L9 coming from outside the rotary intersection is connected to the node N1. The exit link L10 going outside the rotary intersection is connected to the node N2. The entrance link L11 coming from outside the rotary intersection is connected to the node N3. The exit link L12 going outside the rotary intersection is connected to the node N4. The entrance link L13 coming from outside the rotary intersection is connected to the node N5. The exit link L14 going outside the rotary intersection is connected to the node N6. The entrance link L15 coming from outside the rotary intersection is connected to the node N7. The exit link L16 going outside the rotary intersection is connected to the node N8.

(1) Method for Computing Total Value of Link Lengths of Rotary Intersection

In this case, the lengths of the links L1 to L8 that constitute the circular route of the rotary intersection only have to be totalized. Since the link lengths are stored as link information in map data from the beginning, they can be read and totalized.

(2) Method for Computing Radius of Rotary Intersection

For example, it is possible to actually measure the radius of a rotary intersection and store it in map data beforehand. However, this calls for time and effort to actually measure the radius. Here, therefore, description will be given to a method in which the radius of a rotary intersection is computed based on node information stored as link information in map data from the beginning.

Figure 3B:
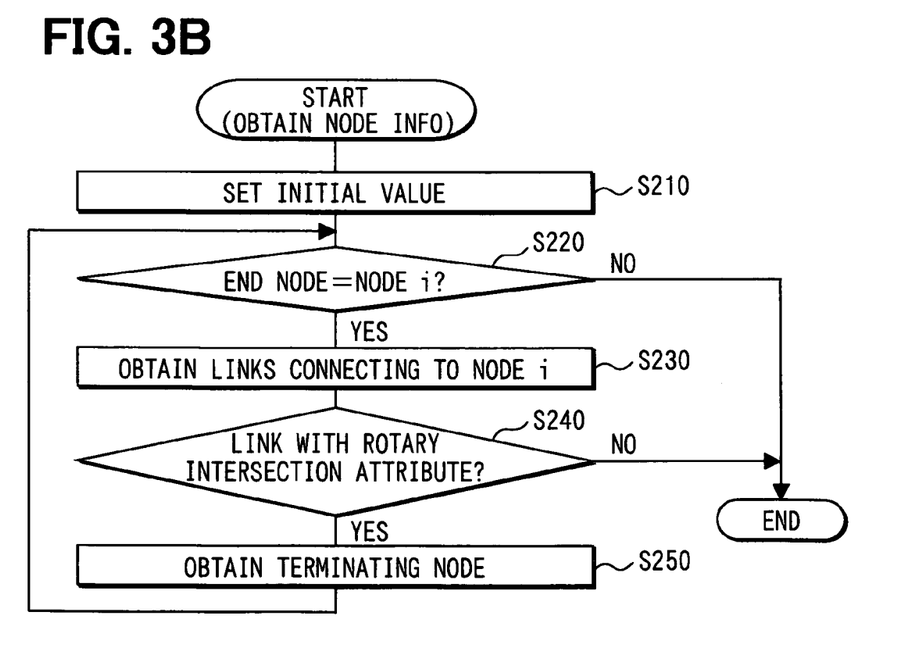
FIG. 3B is a flowchart diagram for illustrating processing to acquire node information.

First, description will be given to the processing to acquire information on nodes that constitute a rotary intersection, relative to an exit road about which guidance is to be provided, with reference to the flowchart in FIG. 3B.

At the first step, or S210, an end point node and an initial value of a search node i are set. Here, description will be given on the assumption that the driver takes the route by which he/she gets off from the node N6 through the link L14. In this case, the end point node is the node N6, and the search node i is the last node preceding the end point node in the set route. The end point node (N6) and the initial value (N5) of the search node i are stored in the storage area in the control unit 29.

At the subsequent step, or S220, the control unit 29 determines whether the search node i disagrees with the end point node. In cases where the search node i takes the initial value (N5), both the nodes disagree with each other (S220: YES), the control unit 29 proceeds to S230. At S230, it acquires information on the links connecting to the search node i. In cases where the search node i=N5, there are three links L5, L6, and L13 connecting to the search node i, as illustrated in FIG. 3A. At S210, however, the node N5 that connects to the end point node N6 through the link L6 in the set route was taken as the initial value of the search node i. As mentioned above, this processing routine is processing for acquiring information on nodes that constitute a rotary intersection relative to an exit road. In this case, therefore, the link L6 can be excluded from candidates. When the search node i=N5, therefore, the links the information of which is acquired at S230 are two, L5 and L13.

At the subsequent step, or S240, the control unit 29 determines whether or not any of the links the information of which was acquired at S230 has the attributes of rotary intersection. In map data, IDs that indicate rotary intersection are set in correspondence with link IDs. Therefore, the above determination can be made by referring to them.

In cases where there is no link having the attributes of rotary intersection (S240: NO), the control unit 29 terminates this processing here. In cases where there is any link having the attributes of rotary intersection (S240: YES), the control unit 29 proceeds to S250. When the search node i=N5, there is the link L5 having the attributes of rotary intersection; therefore, the control unit 29 proceeds to S250.

At S250, the control unit 29 acquires information on the terminating node of the link having the attributes of rotary intersection. In case of the link L5, the terminating node is N4. Information on the terminating node N4 is stored in the storage area in the control unit 29.

The control unit 29 returns to S220, it carries out the processing of S220 to S250 with the search node i=N4 this time. As a result, at S250, the control unit 29 sequentially acquires N3, N2, N1, N8, and N7 as terminating node. The link that connects to the node N7 and has the attributes of rotary intersection is L7, and the terminating node N6 of the link L7 agrees with the end point node. Therefore, the control unit 29 makes a negative determination at S220, and terminates this processing routine.

After the control unit 29 successfully acquired node information, as mentioned above, it computes the radius of the rotary intersection as described below. That is, the control unit 29 acquires the maximum value Xmax and the minimum value Xmin for X-axis and the maximum value Ymax and the minimum value Ymin for Y-axis with respect to the coordinates that constitute the rotary intersection, using information on nodes having the attributes of rotary intersection. More specific description will be given. In case of the rotary intersection illustrated in FIG. 3A, the control unit 29 compares the coordinates (Xn,Yn) (n=1 to 8) in the map data of the eight nodes N1 to N8 that constitute the rotary intersection, and acquires the maximum value and the minimum value respectively for X-axis and for Y-axis. The control unit 29 determines the maximum diameter C using the maximum and minimum X- and Y-coordinates (Xmax, Xmin, Ymax, and Ymin). More specific description will be given. Letting the diameter in the X-axis direction be C1 and the diameter in the Y-axis direction be C2 in FIG. 3A, C1=Xmax-Xmin and C2=Ymax-Ymin. Therefore, the larger of C1 and C2 is taken as the maximum diameter C. In the case illustrated in FIG. 3A, the diameter C1 in the X-axis direction is greater; hence, C=C1.

In cases where the thus computed total value of the link lengths of a rotary intersection is equal to or smaller than a predetermined value, the control unit 29 determines the rotary intersection to be of small scale. Or, in cases where the radius C of a rotary intersection is equal to or smaller than a predetermined value, the control unit 29 determines the rotary intersection to be of small scale.

These predetermined values can be determined by experiments, for example. A rotary intersection of upper-limit scale is identified. This rotary intersection is such that, in cases where "rotary intersection guidance based on direction guidance" is provided, there is little likelihood that a test subject wrongly perceives the direction of an informed exit road while his/her vehicle is running in a rotary intersection in a circular pattern. Based on the total value of the link lengths or the radius of the identified rotary intersection, the predetermined value of the total value of link lengths or the radius is determined as the determination condition. Thus, a determination condition in touch with the feeling of actual users can be determined.

Technique for Determining Simple Shape at S40

At S40, the control unit 29 determines whether or not a rotary intersection about which guidance is to be provided is in simple shape. Description will be given to this technique for determining whether or not a rotary intersection is in simple shape.

Figure 4A:
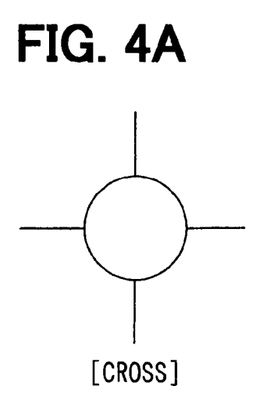
FIGS. 4A to 4G are explanatory diagrams of rotary intersections with simple shape.
Figure 4B:
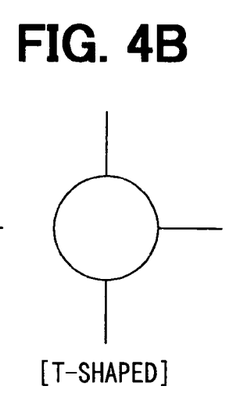
Figure 4C:
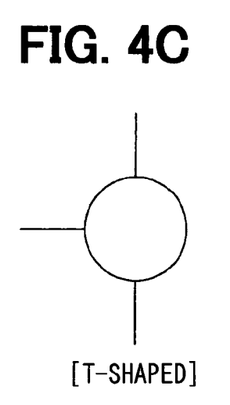
Figure 4D:
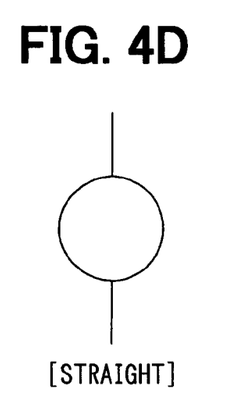

This "simple shape" is determined from the following viewpoint: whether or not the shape of a rotary intersection is so simple that, when "rotary intersection guidance based on direction guidance" is provided, the user provided with that guidance can intuitively understand the shape. In this embodiment, a rotary intersection is considered to be in "simple shape" when the rotary intersection is in shape corresponding to the right angle crossroads as illustrated in FIG. 4A, T-shaped crossroads as illustrated in FIGS. 4B and 4C, or the straight ahead roads as illustrated in FIG. 4D. In other words, a rotary intersection is considered to be in "simple shape" when the rotary intersection is an intersection of right angle crossroads, T-shaped crossroads, or straight ahead roads. In case of right angle crossroads, T-shaped crossroads, or straight ahead roads, only the guidance of, for example, "Turn to the right," "Turn to the left," or "Go straight" is provided as "rotary intersection guidance based on direction guidance." This is because that this type of guidance is very easy to intuitively understand.

Figure 4E:
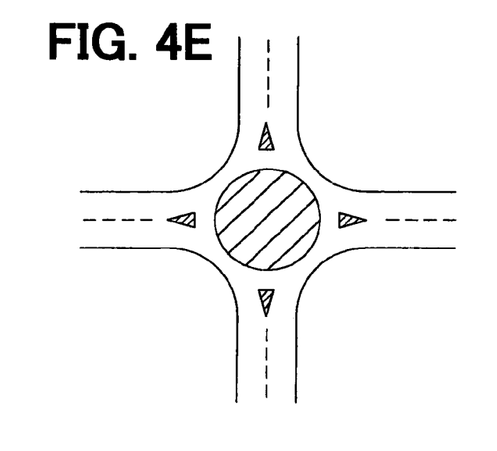
Figure 4F:
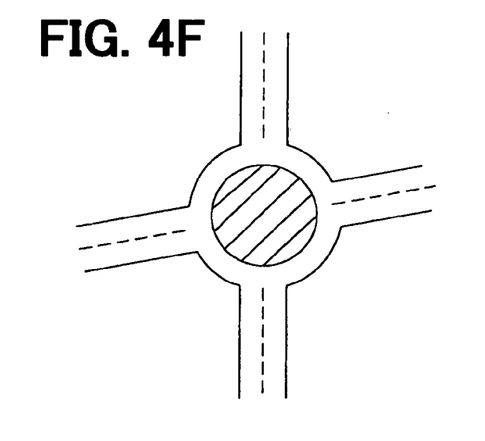
Figure 4G:
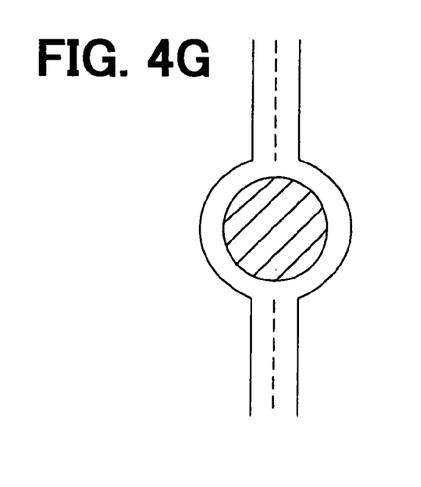

FIGS. 4A to 4D schematically illustrate rotary intersections. For example, the right angle crossroads illustrated in FIG. 4A can be classified as follows: in some of them, an entrance road and an exit road are definitely separated as two roads, as illustrated in FIG. 4E, and in others, an entrance road and an exit road are separated from each other just by lane mark, as illustrated in FIG. 4F. The shape illustrated in FIG. 4E is found mainly in large-scale rotary intersections, and the shape illustrated in FIG. 4F is found mainly in small-scale rotary intersections. The T-shaped crossroads illustrated in FIGS. 4B and 4C are smaller in number of connected road just by one than right angle crossroads; therefore, detailed description will not be given to these roads. The straight ahead roads illustrated in FIG. 4D are designated as a rotary intersection; however, the following shape is assumed: in reality, there is actually an impassable area in the center of the road, as illustrated in FIG. 4G, and drivers must go round a curve, avoiding the area. Intersections in such shape are also classified under the category of rotary intersection; therefore, such intersections are also included in rotary intersections in this embodiment.

When a shape corresponding to right angle crossroads, T-shaped crossroads, or straight ahead roads is considered as simple shape, for example, roads need not to intersect with each other strictly at right angle. That is, even simple shape has some tolerance as a matter of course. In the right angle crossroads illustrated in FIG. 4F, for example, the angle θ formed between an entrance road and an exit road next to the entrance road is not exactly 90° but 70° or 110°. Even crossroads of this sort may be counted among right angle crossroads.

Figure 5A:
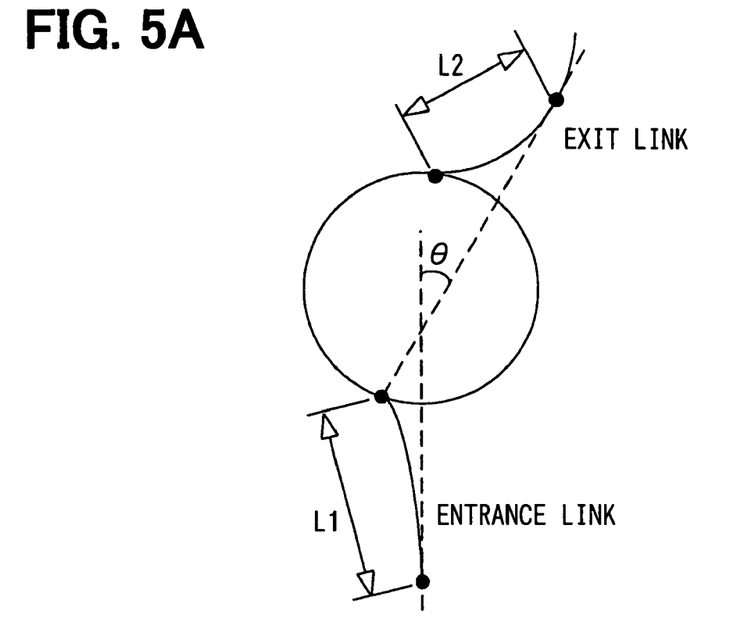
FIG. 5A is an explanatory diagram of an angle formed between links.

Consequently, the conditions under which a rotary intersection can be said to be in simple shape are defined as follows: the rotary intersection should be an intersection of right angle crossroads, T-shaped crossroads, or straight ahead roads. In addition, when it is assumed that the angle θ formed between the entrance link L1 and the exit link L2 of the rotary intersection, as illustrated in FIG. 5A, is 90°×n (n is an integer other than zero)±α° (α is zero or a positive number), α should be less than 30. The reason for this is as follows: in case of a rotary intersection of this sort, the driver can probably intuitively understand an exit road without embarrassment when such guidance as "Turn to the right," "Turn to the left," or "Go straight" is provided.

Therefore, the "rotary intersection guidance based on direction guidance" provided at S50 is as described below according to the angle θ (°) formed between the entrance link L1 and the exit link L2. In this case, clockwise turn is taken as positive.

60<θ≦120 . . . "Turn to the right," "Go rightward in the rotary intersection," etc.

−30≦θ≦30 . . . "Go straight," "Go straight in the rotary intersection," etc.

−120<θ≦−60 . . . "Turn to the left," "Go leftward in the rotary intersection," etc.

Effect of Embodiment

Up to this point, description has been given to the construction and action of this embodiment. With an automobile navigation system 1 in this embodiment, appropriate guidance can be provided based on the scale of rotary intersections. Description will be given to a specific example of this guidance.

Figure 5B:
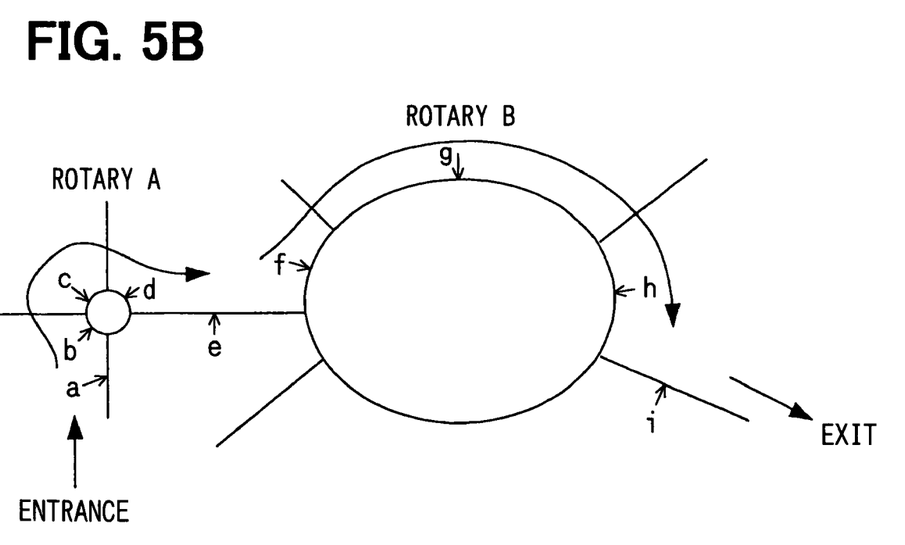
FIG. 5B is an explanatory diagram illustrating an example of guidance appropriately provided according to scales of rotary intersections.

As illustrated in FIG. 5B, a guided route that goes through a rotary intersection A of small scale and in simple shape (right angle crossroads in this example) and a large-scale rotary intersection B is set. It will be assumed that the driver takes the link a shown in FIG. 5B as the entrance road, and get off from the link i by way of link a→link b→link c→link d→link e→link f→link g.

Since the rotary intersection A is of small scale (S20 in FIG. 2:YES) and in simple shape (S40:YES), the control unit 29 proceeds to S50. Therefore, "rotary intersection guidance based on direction guidance" is provided. Specifically, such guidance as "Turn to the right," or "Go rightward in the rotary intersection" is provided. Since the rotary intersection B is of large scale (S20: NO), the control unit 29 proceeds to S30. Therefore, "rotary intersection guidance based on exit number" is provided. Specifically, such guidance as "Get off the rotary intersection from the third exit" is provided.

When consideration is given to guidance about a rotary intersection of small scale and in simple shape like the rotary intersection A in FIG. 5B, the user can easily notice the positional relation between the entrance road and the exit road. Therefore, he/she can more easily intuitively understand the exit road when he/she is provided with such guidance as "Turn to the right." In this case, the rotary intersection guidance based on exit number," in which it is informed that from what number exit road, relative to the entrance road, the driver should get off, probably slightly disagrees with the user's feeling. In this case, consequently, "rotary intersection guidance based on direction guidance" is provided (S50 in FIG. 2).

Meanwhile, with respect to guidance about a large-scale rotary intersection like the rotary intersection B in FIG. 5B, the "rotary intersection guidance based on direction guidance" poses varied unfavorableness, as described in the section of "BACKGROUND OF THE INVENTION." Therefore, "rotary intersection guidance based on exit number" (S30 in FIG. 2) is provided. When a driver follows the guidance of "Get off from the second exit road ahead," for example, he/she need not be conscious of by how many degrees he/she has been going round a curve after entering a rotary intersection. The driver can appropriately go through the rotary intersection just by being conscious of the number of exit roads.

Also, in cases where a rotary intersection is of small scale (S20 in FIG. 2:YES) but it is in complicated shape (S40: NO), the control unit 29 proceeds to S30 and provides "rotary intersection guidance based on exit number." In cases where there are five or more exit roads or the number of exit roads is not more than four but exit roads are close to each other in their directions, the driver may be unable to immediately identify an exit road only by the guidance of "Turn to the right," for example. In this case, therefore, the "rotary intersection guidance based on exit number," in which such guidance as "Get off from the fourth exit road ahead" is provided, is easier for the user to understand.

Other Embodiments

Hereafter, description will be given to other embodiments.

Figure 2:
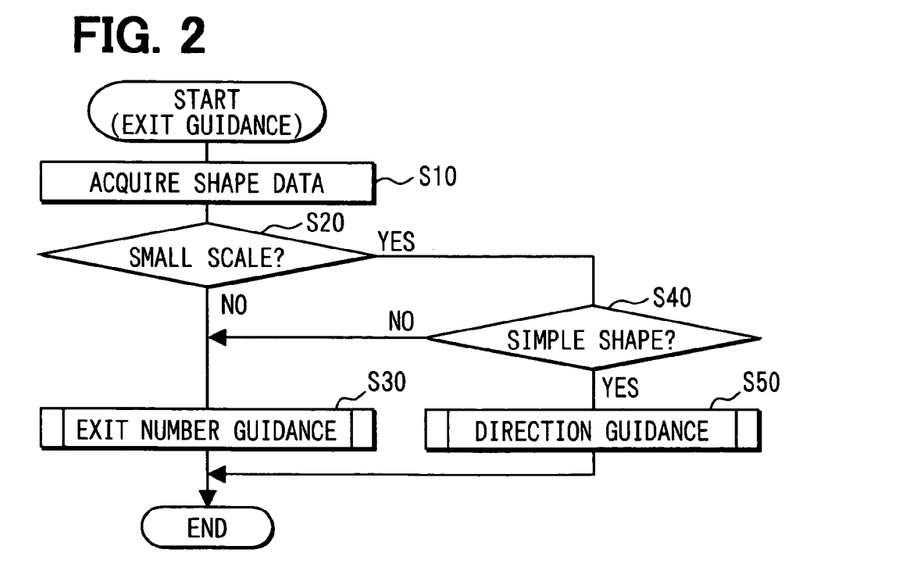
FIG. 2 is a flowchart diagram for illustrating processing of guidance for exit roads of a rotary intersection.

(i) In the above-mentioned embodiment, the condition for determining a rotary intersection to be in "simple shape" at S40 in FIG. 2 is that the rotary intersection should be an intersection of right angle crossroads, T-shaped crossroads, or straight ahead roads. Further, another condition is such that, when the angle θ formed between the entrance link L1 and the exit link L2 of the rotary intersection is defined as 90°×n (n is an integer other than zero)±α° (α is zero or a positive number), α should be less than 30. The reason for this is as follows: with the angle within the range of this sort, the user can intuitively understand an exit road without special embarrassment when he/she is provided with such guidance as "Turn to the right," "Turn to the left," or "Go straight."

However, there may be differences between individuals. To cope with this, the invention may be so constructed that the following can be implemented: the value of α that determines the above allowable range can be manually adjusted by the user. In this case, the control unit 29 accepts information input from the user through the operation switch group 22 or the like, and changes the setting of the value of α for defining simple shape according to the accepted information input. For example, a user who experiences slightly great discomfort at ±30° may make the setting of α=15. Thus, a rotary intersection that is not within the range of 90°×n±15° does not meet the condition for simple shape.

(ii) In the above-mentioned embodiment, the following is adopted as the condition for determining that a "rotary intersection is of small scale" at S20 in FIG. 2: the "total value of the link lengths of the rotary intersection" or the "radius of the rotary intersection" should be equal to or lower than a predetermined value.

The foregoing is also the case with this condition. There are differences between individuals in what scale they feel to be of "small scale" with respect to rotary intersections. (More specific description will be given. When a rotary intersection is of small scale and in simple shape, "rotary intersection guidance based on direction guidance" is provided. There are differences between individuals in for rotary intersections of how small scale they feel comfort when they are provided with such guidance.) With these differences between individuals taken into account, the invention may be so constructed that the following can be implemented: the predetermined value of the total value of link lengths or the radius that determines the above-mentioned determination condition can be manually adjusted by the user. As in the above case of (i), the control unit 29 accepts information input from the user through the operation switch group 22 or the like. Then, it changes the setting of the predetermined value of the total value of link lengths or the radius that determines the determination condition according to the accepted information input. The control unit 29 makes the determination at S20 based on the total value of link lengths or the radius the setting of which was changed.

With the radius of a rotary intersection being 10 m or so, for example, many users probably feel comfort when "rotary intersection guidance based on direction guidance" is provided. In a rotary intersection with a radius of 20 m or so, for example, many users probably feel that "guidance is difficult to understand" when "rotary intersection guidance based on direction guidance" is provided. Even in a rotary intersection with a radius of 20 m or so, however, some users may feel that "rotary intersection guidance based on direction guidance" is easier to understand than "rotary intersection guidance based on exit number." To eliminate such differences between individuals, it is preferable that the predetermined value should be manually adjustable.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A routing assistance system provided in a vehicle, the system comprising:
    a guidance unit that provides the vehicle with guidance along a guided route including a rotary intersection, which the vehicle enters via an entrance road;
    a guidance control unit that causes the guidance unit to provide guidance with respect to an exit road of the rotary intersection; and
    a determination unit that executes a determination of whether or not the rotary intersection has a predetermined simple shape and a scale smaller than or equal to a predetermined scale, wherein,
    when the determination is affirmed, the guidance control unit causes the guidance unit to provide a first guidance with respect to a direction of an exit road about which guidance is to be provided, relative to the entrance road, and
    when the determination is negated, the guidance control unit causes the guidance unit to provide a second guidance with respect to from what number exit road of a plurality of exit roads of the rotary intersection, relative to the entrance road, the vehicle is to exit.

2. The routing assistance system according to claim 1, wherein
    the predetermined simple shape of the rotary intersection includes a shape corresponding to right angle crossroads, T-shaped crossroads, or straight ahead roads.

3. The routing assistance system according to claim 2, wherein
    the first guidance is provided such that a user of the vehicle intuitively understands one of turning to right, turning to left, and going straight, relative to the entrance road.

4. The routing assistance system according to claim 2, wherein
    an angle $\theta$ formed between the entrance road and an exit road, about which the first guidance is to be provided, in the right angle crossroads, T-shaped crossroads, or straight ahead roads is $90°\times n$ (n is an integer other than zero)$\pm\alpha°$ ($\alpha$ is zero or a positive number less than 30).

5. The routing assistance system according to claim 4, further comprising:
    an accepting unit that accepts information input by a user's operation, wherein
    the guidance control unit changes $\alpha$ to a given value based on the information input accepted via the accepting unit, and
    the guidance control unit executes a determination based on the angle $\theta$ using the given value of $\alpha$.

6. The routing assistance system according to claim 1, wherein
    the predetermined scale includes a scale that a total value of link lengths of the rotary intersection is lower than or equal to a first predetermined value or a scale that a radius of the rotary intersection is lower than or equal to a second predetermined value.

7. The routing assistance system according to claim 6, further comprising:
    an accepting unit that accepts information input by a user's operation, wherein
    the guidance control unit changes a setting of the first predetermined value or the second predetermined value based on information input accepted via the accepting unit, and
    the guidance control unit executes a determination based on a total value of link lengths or a radius, which is obtained based on the changed setting.

8. The routing assistance system according to claim 1, wherein
    the guidance unit includes a sound outputting unit that outputs sound, and
    the guidance control unit causes the sound outputting unit to output a guide speech to provide the first guidance or the second guidance.

9. A computer program product in a computer-readable medium for use in a routing assistance system, which provides with guidance along a guided route including a rotary intersection and is provided in a vehicle entering the rotary intersection via an entrance road thereof, the product comprising instructions for:

executing a determination of whether or not the rotary intersection has a predetermined simple shape and a scale smaller than or equal to a predetermined scale;

providing, when the determination is affirmed, a first guidance with respect to a direction of an exit road about which guidance is to be provided, relative to the entrance road; and providing, when the determination is negated, a second guidance with respect to from what number exit road of a plurality of exit roads of the rotary intersection, relative to the entrance road, the vehicle is to exit.

10. A routing assistance system provided in a vehicle, the system comprising:

a guidance means for providing the vehicle with guidance along a guided route including a rotary intersection, which the vehicle enters via an entrance road;

a guidance control means for causing the guidance means to provide guidance with respect to an exit road of the rotary intersection; and a determination means for executing a determination of whether or not the rotary intersection has a predetermined simple shape and a scale smaller than or equal to a predetermined scale, wherein when the determination is affirmed, the guidance control means causes the guidance means to provide a first guidance with respect to a direction of an exit road about which guidance is to be provided, relative to the entrance road, and when the determination is negated, the guidance control means causes the guidance means to provide a second guidance with respect to from what number exit road of a plurality of exit roads of the rotary intersection, relative to the entrance road, the vehicle is to exit.

* * * * *